United States Patent [19]

Daoust et al.

[11] Patent Number: 4,959,903

[45] Date of Patent: Oct. 2, 1990

[54] CITRUS FRUIT PULP CUTTER

[76] Inventors: Gilbert Daoust, 1074 Cabana Avenue, Boisbriand, Canada, J7G 2P8; Michel Gingras, 14713 Notre Dame Street, East Montreal, Canada, H1A 3T3

[21] Appl. No.: 296,788

[22] Filed: Jan. 13, 1989

[51] Int. Cl.$^5$ .............................................. A22B 5/16
[52] U.S. Cl. .................................. 30/123.5; 30/114; 99/537; 99/540; 99/584
[58] Field of Search .................... 30/123.5, 113.1, 114; 99/537, 540, 584

[56] References Cited

U.S. PATENT DOCUMENTS

| | | | | |
|---|---|---|---|---|
| 1,339,367 | 5/1920 | Risdon | ............................... | 30/113.1 |
| 2,463,166 | 3/1949 | Ghisletta . | | |
| 2,733,746 | 2/1956 | Rauner . | | |

FOREIGN PATENT DOCUMENTS 210822 4/1921 Canada .
275549 11/1927 Canada .
470436 1/1951 Canada .

Primary Examiner—Frank T. Yost
Assistant Examiner—Willmon Fridie, Jr.

[57] ABSTRACT

A cutting device for segmenting and derinding a half-section of a citrus fruit and for collecting the pulp thereof. It comprises: a rigid first ring, a number of arcuate knives spacedly upwardly projecting from a second integral ring toward an apex area to interconnect so as to form an outer semispherical open frame, the second ring being freely mounted to the first ring, each knife having a lengthwise exterior bevelled sharpened segmenting edge, a number of arcuate radially thick blades spacedly upwardly projecting from a third integral ring radially inwardly of the outer frame to form an inner semispherical open frame, the third ring being freely mounted to the first ring, each blade having an exterior sharpened derinding edge, the outer frame being rotatable about the first ring, and the inner frame being releasably locked to the first ring. In operation, the flat face of the fruit half-section is applied directly against and pushed fully into the outer frame, for segmenting the pulp with the knives cutting edges, and the peel is thereafter rotated drawing therewith the outer frame exclusively of the inner frame since the blades are thicknesswisely anchored into the pulp, for derining the fruit with the blades derinding edges.

15 Claims, 5 Drawing Sheets

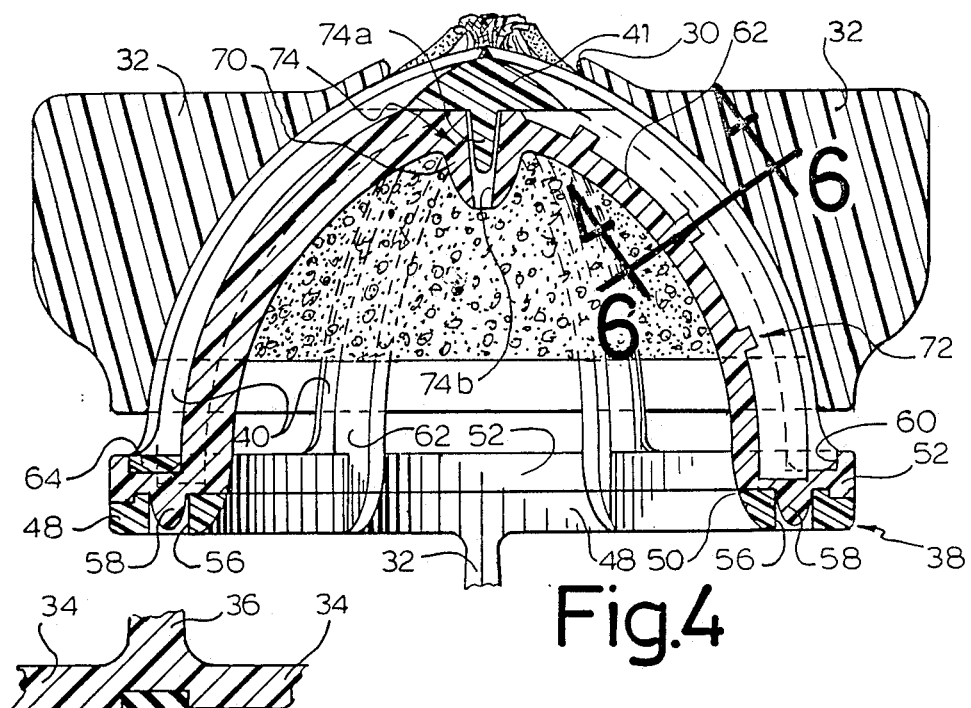
Fig.4
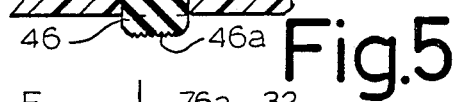
Fig.5
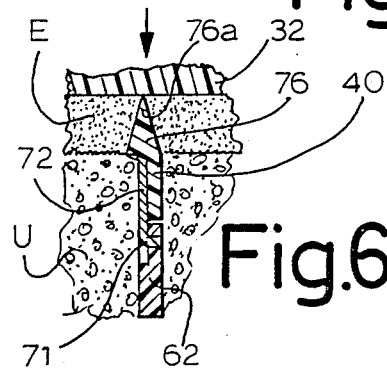
Fig.6
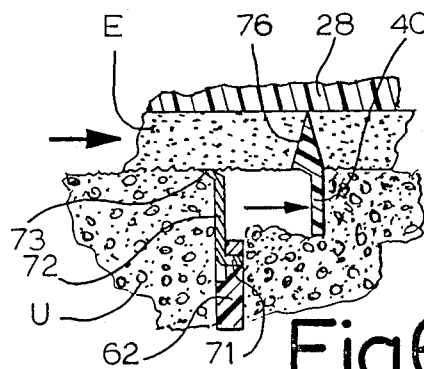
Fig.6a
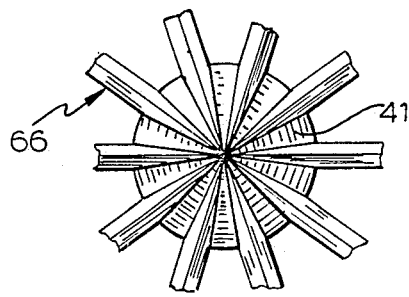
Fig.7  Fig.8

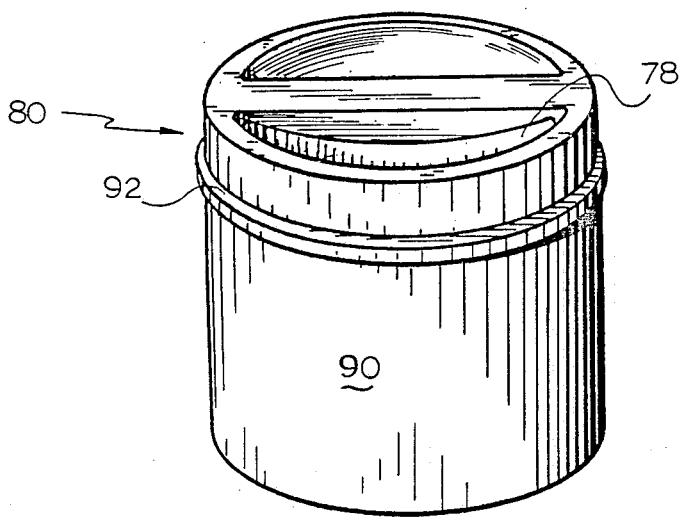
Fig.10
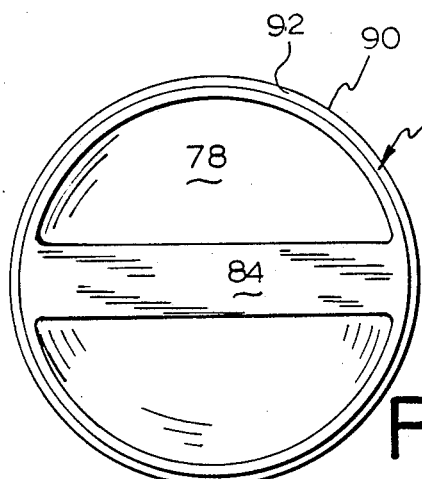
Fig.11
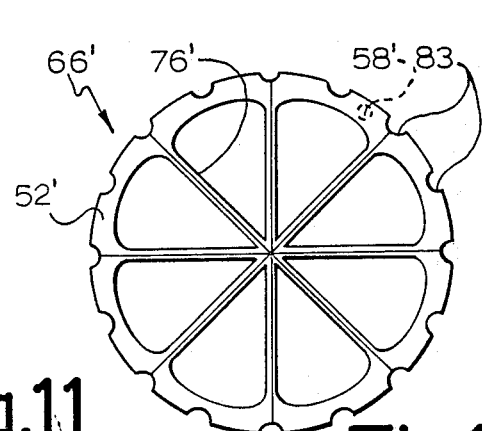
Fig.12
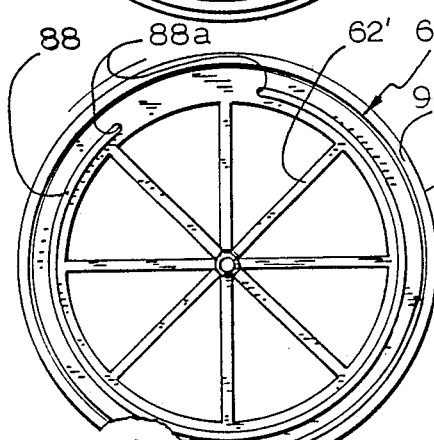
Fig.13
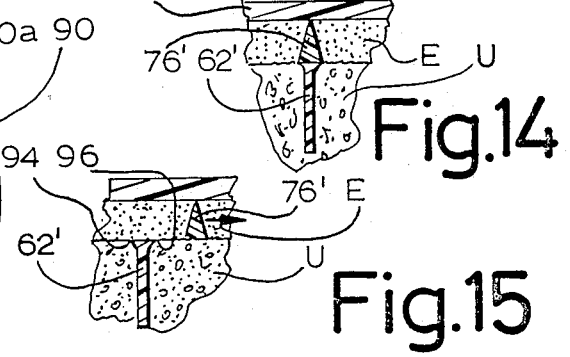
Fig.14
Fig.15

CITRUS FRUIT PULP CUTTER

FIELD OF THE INVENTION

This invention relates to cutting devices to separate the pulp from the peel of citrus fruits.

BACKGROUND OF THE INVENTION

Citrus fruits include grapefruits, limes, lemons, cumquats, tangerines, oranges and the like. They are generally spherical and composed of an interior edible pulp and an exterior protecting semi-rigid peel. A pulp half section defines a plurality of sector shaped segments each consisting of an edible soft part lodged into a cavity called the lith, and two opposite semi rigid fiber partitions. The fiber partitions radially inwardly merge at a central semi-rigid apex fiber portion, and radially outwardly merge with the peel or rind. Seeds or "pips" are also lodged into the lith.

Existing tools for extracting the succulent part of the pulp from the citrus fruit are usually of the type by which the pulp is crushed with a semi spherical open frame made of cutting knives, and the liquid solution (which contains the lith, and also the somewhat undesirable fiber content of the partitions) thereby obtained is collected and filtered (to reject the non-succulent seeds and larger fiber portions) prior to drinking. Other tools for extracting the pulp include cutting devices that effect segmentation of the pulp, i.e. make sector shaped cuts thereunto, and/or derind the pulp, i.e. scrape the pulp only about its interface with the peel.

These tools are inefficient, particularly with respect to the thoroughness in their withdrawing of all the edible part of the pulp.

OBJECTS OF THE INVENTION

The object of the invention is therefore to provide a segmenting and derinding device for citrus fruits, which will reduce to the minimum losses associated with the recuperation of the edible pulp thereof.

A supplemental object of the invention is to provide such a device, which is of simple construction and cheap in manufacturing costs.

An object of the invention is to provide such a tool as above-mentioned, which will be able to adapt to citrus fruits of various dimensions.

SUMMARY OF THE INVENTION

In accordance with the objects of the invention, there is disclosed a cutting device for segmenting and derinding a half-section of a citrus fruit and for collecting the pulp thereof, said cutting device comprising: a rigid annular member a number of arcuate knives spacedly upwardly projecting from a first integral ring toward an apex area to interconnect so as to form an outer semi-spherical open frame, said first ring being freely mounted to said annular member, each said knife having a first lengthwise exterior bevelled sharpened segmenting edge, a number of arcuate radially thick blades, spacedly upwardly projecting from a second integral ring radially inwardly of said outer frame to form an inner semi-spherical open frame, said second ring being mounted to said annular member, each said blade having a first exterior sharpened derinding edge, slider means, to enable said outer frame to rotate about said annular member; lock means, to lock said inner frame to said annular member; wherein in operation, the flat face of said fruit half is applied directly against and pushed fully into said outer frame, for segmenting said pulp with said knives segmenting edges, and the peel is thereafter manually rotated in a fruit derinding direction so as to draw therewith said outer frame exclusively of said inner frame since said blades are thicknesswisely anchored into said pulp, for derinding the fruit with said blades derinding edges; further including collecting means, to collect the segmented and derinded pulp.

Preferably, said collecting means defines a large flat disc, positioned on a horizontal support surface, arcuate rigid arms supporting said annular member and said rings to said disc spacedly thereof, and a cup member positioned on said disc in register with said interengaged inner and outer frames, for collecting the pulp cut during the segmenting-derinding operation.

Advantageously, each said knife segmenting edge has a cross-sectionally V-shape section defining a radially outwardmost cutting tip.

Profitably, each said blade further includes a second derinding edge opposite the first one, wherein there are two said fruit derinding directions of rotation.

It would be desirable to have a large rigid semi-spherical cover member, said cover member having a relatively large through-bore at its apex portion, said cover member covering said fruit half section during segmentingderinding operations and facilitating said manual rotation thereof.

Preferably, the base disc supporting said annular member and frames is itself supported by a few anti-skid elastomeric feet.

It is envisioned that each said inner frame blade further includes a few radially outturned ears, and said outer frame knives each further includes a few radially inturned notches adapted to mate with and be engaged by said ears, for cooperative guiding action during rotation of the mobile knives of said outer open frame about said blades.

It would also be useful if said slider means would include: an annular cavity made on the top face of said second integral ring, wherein said first integral ring of said knives is matingly slidingly releasably engaged into said annular cavity.

Profitably, said lock means is a releasable locking means and includes a number of pins or fingers, each downwardly projecting from said second integral ring, and at least as many cavities, made into the top surface of said annular member for receiving said fingers.

Advantageously, said outer open frame integral ring includes a plurality of notches at its periphery, and said semi-spherical cover member includes a plurality of inturned peripheral bottom ears, said ears adapted to releasably matingly engage said notches when said fruit half section has been pushed completely into said outer open frame and when said cover member is fully engaged around the citrus fruit half section.

In this latter case, said slider means preferably includes: an arcuate cavity, made on the top face of a radially outward projection of said second integral ring, and at least one finger, downwardly projecting from said first integral ring and slidingly releasably engaged into the latter arcuate cavity.

Advantageously, each said blade has a second derinding edge opposite said first derinding edge, for derinding action in either one of the two directions of rotation of the outer knife frame. It would be desirable to provide in this case a large rigid semi-spherical cover member, said cover member having a relatively large through-bore at its apex portion, said cover member covering said fruit half section during segmenting-derinding operations and facilitating said manual rotation thereof.

Preferably, there is provided a large bowl, into which is anchored said cover member coaxially thereto, the bottom end of said bowl defining an open mouth extending beyond the corresponding bottom mouth defined by said cover member.

Advantageously, a large sleeve frame member surrounds and is anchored at an intermediate section thereof to the peripheral edge section of said ring member of the blades, said sleeve frame member diametrally larger than said bowl wherein the latter is engageable therein.

It is envisioned to add a annular ridge, exteriorly mounted to the upper section of said bowl and designed to seat against the top edge of said sleeve frame member when said bowl has fully engaged said sleeve frame member.

BRIEF DESCRIPTION OF THE DRAWINGS

FIGS. 4 and 5 are cross-sectional views taken along lines 4—4 and 5—5 respectively of FIG. 2;

FIGS. 6 and 6a are cross-sectional views taken along line 6—6 of FIG. 4, suggesting how the pulp can be scraped from the inner wall of the peel by the bevelled edge of an inner frame blade;

FIGS. 7 and 8 are top and bottom broken plan views of the outer knife frame and inner blade frame respectively of the fruit cutter;

FIGS. 10 and 11 are isometric and top plan views respectively of the topmost bowl of the fruit cutter of FIG. 9; FIG. 12 is a top plan view of the outer knife frame of the fruit cutter of FIG. 9;

FIG. 13 is a top plan view of the inner blade frame of the fruit cutter of FIG. 9; and FIGS. 14-15 are views similar to that of FIGS. 6-6a but for the second embodiment of the invention.

DETAILED DESCRIPTION OF THE INVENTION

Figure 1:
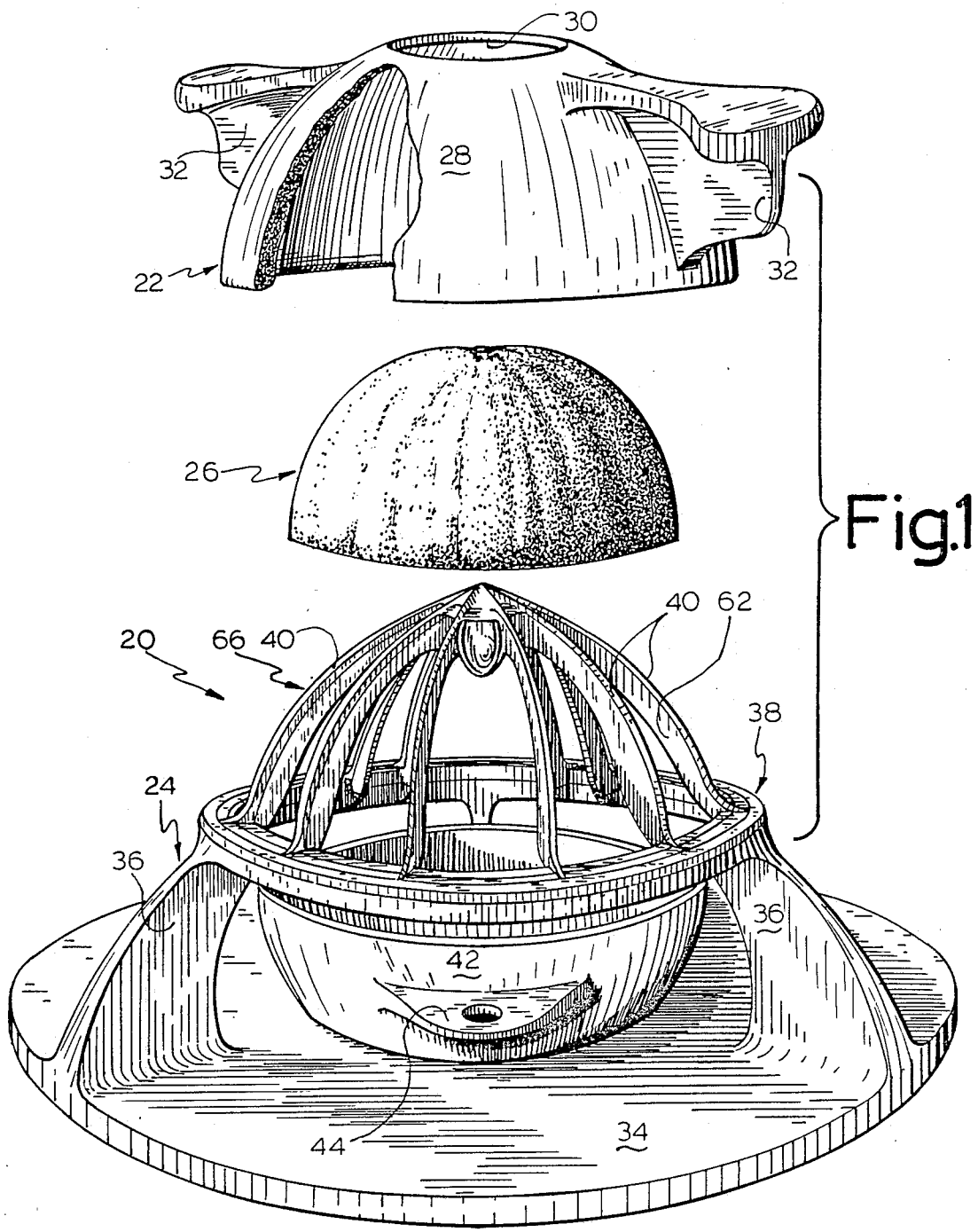
FIG. 1 is an isometric, partly broken view of a pulp cutter in accordance with a first embodiment of the invention, before use and suggesting how a citrus fruit half section can be cut therewith.
Figure 2:
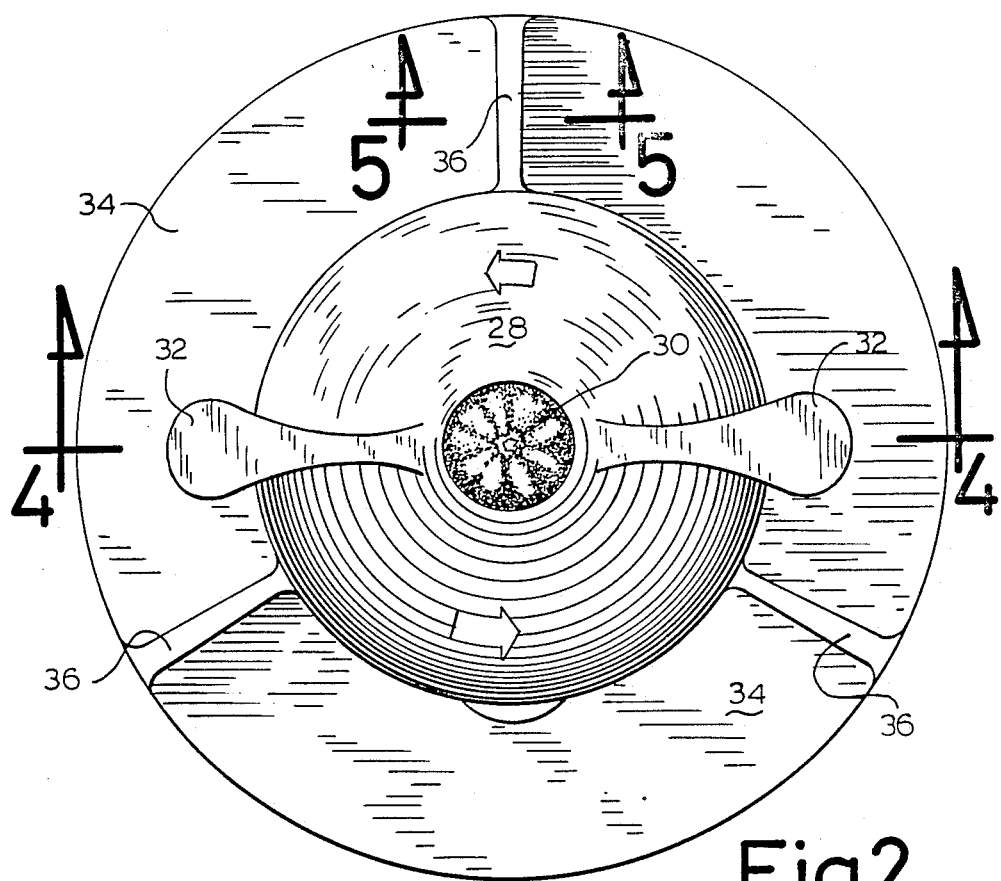
FIGS. 2 and 3 are top and front elevation views respectively of the fruit cutter, as it appears when in use.
Figure 3:
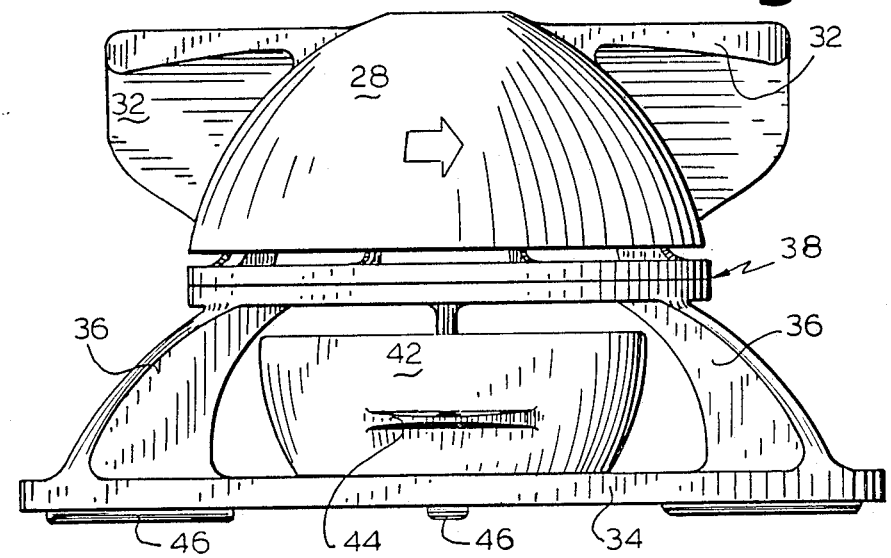
Figure 9:
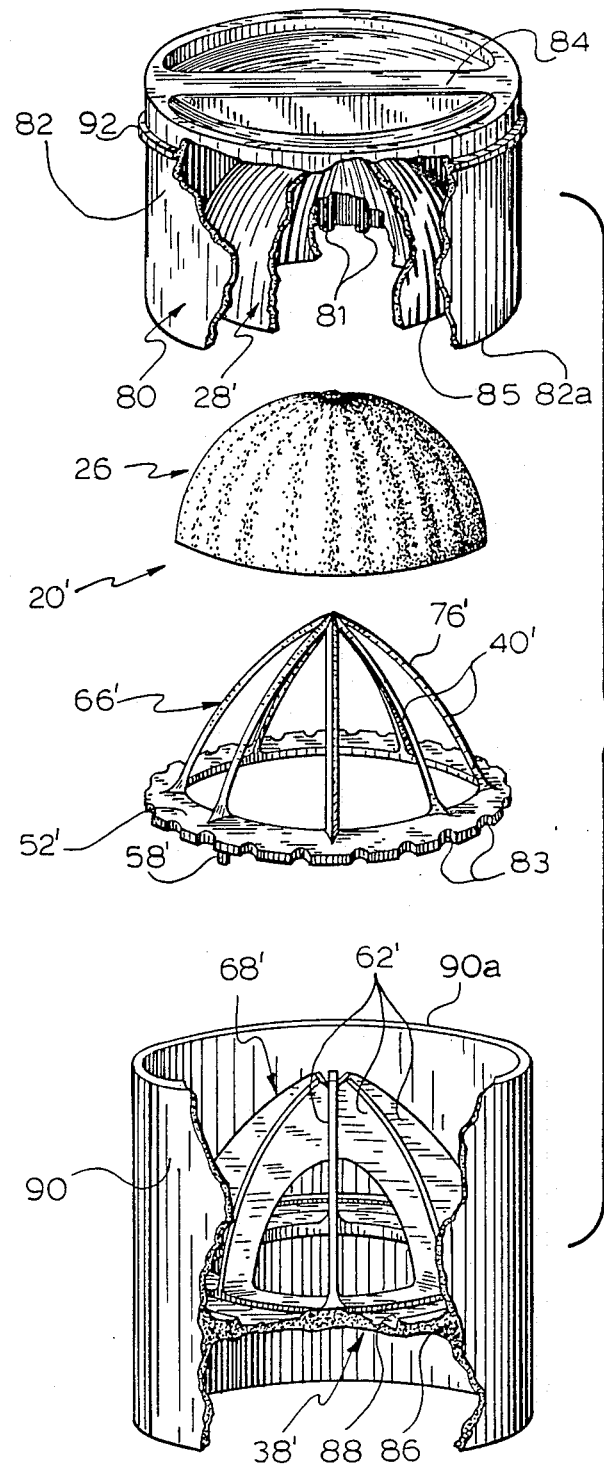
FIG. 9 is a view similar to that of FIG. 1 but for a second embodiment of the invention.

A first embodiment of citrus fruit cutter 20 is illustrated in FIG. 1 and includes an upper half cover section 22 and a lower half section 24, wherein a half section of citrus fruit 26 is to be positioned between sections 22 and 24 with the flat, cut, circular face of the fruit facing downwardly toward the cutter section 24. Upper part 22 includes a rigid inverted cup shaped cover 28, with a large hole 30 at its apex and two opposite outwardly projecting arms 32, for facilitating handling of the part 28. Lower part 24 includes an enlarged base flat disc 34, having a few spaced arcuately upturned legs 36 for supporting a diametrally smaller ring member 38 parallel to plate 34. A plurality of arcuate exterior knives 40 and a plurality of arcuate interior blades 62 spacedly upwardly project from the large ring member 38 toward cup-shaped apex plates 41, 70, respectively to interconnect so as to form an outer and an inner semi-spherical open frame 66. 68 respectively. A cup-shaped container 42 is slided over base 34, between two support legs 36, to come in vertical register with the knives 40 substantially concentrically to support ring member 38. Container 42 may have transverse handles 44. Disc 34 may also be provided with a few elastomeric feet 46, with a knurled anti.skid underface 46a, see FIG. 5.

Ring member will now be detailed. An annular support member 48 forming part of ring 38 is integrally connected to the top of legs 36 at the inner peripheral edge thereof. Support member 48 includes a number of vertical through bores 56. Said plurality of arcuate radially thick blades 62 spacedly upwardly project from an integral bottom annular member 50, which also forms part of ring member 38, toward the cup-shaped apex plate 70, to interconnect so as to form the inner semi-spherical open frame 68. Blades 62 and annular member 50 are positioned radially inwardly of the knives 40, and of a further annular plate 64 integrally joining the bottom end of knives 40. The bottom ends of arcuate blades 62 are integrally joined by another annular frame member 52 at the inner peripheral edge section thereof. Annular member 52 constitutes the radially outward integral portion of annular member 50, and rests flatly against annular support 48. Annular member 52 includes an annular cavity or recess on the top face thereof which forms a track 60 for slidingly receiving annular plate 64 joining knives 40, and further includes a number of downwardly dependent pins or fingers 58 releasably engaged into the vertical through bores 56 of annular base support 48.

When looking at FIG. 4, it can be understood that blades 62 are releasably locked to base support 48 while knives 40 are not, which is to say, the outer semi-spherical open knife frame 66 is rotatable relative to the inner semi-spherical open blade frame 68. This relative motion of frames 66, 68 is facilitated by the guide means 60, 64 which cooperate with an assembly 74. A separate cutting blade section 72 is anchored by ear 71 to each main blade body 62. Assembly 74 includes a finger 74a that downwardly centrally depends from the outer frame cup-shaped apex portion 41, and a vertical cavity 74b made centrally in the inner frame apex portion 70, wherein body 70 pivots around finger 74a during relative rotation of frames 66, 68.

Alternately, finger 74a could be replaced by an elongated spindle (not shown) having two enlarged ends to retain frame apices 41, 70, together while enabling rotation of said frames 66, 68 in coaxial fashion.

It is considered within the scope of the invention to provide elastomeric bands (not illustrated) on the inner face of cover 28, to increase the gripping action thereof on the citrus fruit peel during rotation of cover 28. It is also considered to be within the scope of the present invention that the present segmenting and derinding tool for citrus fruits be effective for citrus fruits of various dimensions (large and small diameters).

The cross-sectionally triangular radially outward cutting edge 76 of each knife 40 is shown in FIGS. 6-6a. The radially outward tip 76a of cutting edges 76 are designed to cut through pulp U. for segmenting same. Projections 72 of blades 62 further include on their radially outward edge a transverse bevelled derinding edge 73, for shearing action between the pulp U and the peel E in a single direction of rotation of knives 66, i.e. for derinding the fruit 26.

In operation, knives 40, 76 are rotated by rotating outer frame 66, so that the blade edge sections 72 abut against the knife section 40 (see FIG. 6). wherein the scraping edge 73 of each blade section 72 becomes hidden by the knive cutting edge sections 76 which allows to push the fruit with the cover 28 until penetration of the knive cutting edge sections 76 into the peel. The cover prevents one cutting himself. Then, the cover is rotated (see FIG. 6a). Indeed, when the citrus fruit half section 26 is fully engaged through frames 66 and 68, blades 62 are then anchored into the pulp U. Since the blades 62 are also anchored to the base annular support 48, and since the blades 62 extend short of the peel E while knives 40 are of such thickness that the cutting edges 76 engage peel E with the main body of these knives at 40 extends through the outer peripheral section of the pulp U, when outer frame 66 (including cutting edges 76) is rotated, the peripheral section of pulp U is sheared by the tapered edge 73. The result is a clean derinding of the citrus fruit, and the pulp sectors fall within bowl 42.

All the pieces constituting the present segmenting-derinding device can be taken apart, for cleaning purposes.

A second embodiment of the invention is shown (at 20') in FIGS. 9-15. The cover 28' is dome-shaped and is anchored at its apex to the bottom wall 78 of a large cylindrical bowl 80 coaxially thereto and also to the open bottom mouth circular edge 82a thereof. Wall 78 is inwardly recessed from the corresponding end of the main cylindrical wall 82 of bowl 80, and a radial central projection 84 outwardly projects from wall 78. Projection 84 constitutes a handle for facilitating rotation of bowl 80. The bottom edge 82a of body 82 extends beyond the level of the bottom edge 85 of cover 28. The bottom edge 85 further includes a plurality of inturned ears 81, designed to engage with a corresponding number of notches 83 made at the bottom peripheral outer edge of annular plate 52' of frame 66' when a citrus fruit half section is applied against frame 66' and when cover 28' is applied against the citrus fruit. Ears 81 and notches 83 constitute releasable anchoring means between cover 28' and knives 66'.

Annular support 38' of inner frame 68' includes a peripheral radially outturned plate 86 having an arcuate cavity or track 88 for sliding engagement by at least one downturned pin 58' projecting from the peripheral underface of the bottom annular plate 52' of frame 66'. The inner frame 68' is surrounded and supported by a sleeve frame 90, anchored at an intermediate section thereof to the peripheral outer edge of annular plate 86 coaxially thereto. Cover 82 is diametrally smaller than base cylinder 90 wherein the former is engageable within the latter; an exterior ridge 92 at the upper section of body 82 will then come to sit against the top edge 90a of base cylinder 90, wherein the bottom edge 82a of body 82 will extend short of the top face of annular plate 86.

When pin 58' reaches one or the other of the ends 88a of the track 88 (FIG. 13), the knives 76' and the cutting blade sections 62' become aligned (FIG. 14). which enables knives 76 to penetrate the pulp U and the peel E.

Hence, the inventive ingenuity of the present invention remains as follows: the half section of citrus fruit 26 is taken in sandwich between cover 28' and knives 66' and knives 66' are applied against blades 68', to segment the pulp; and the bowl 82 is rotated, to derind the fruit. At the end of the segmenting action, the cover 28' and knives 66 are temporarily integral via locking means 81, 83; the blades 68' being anchored peripherally to supporting sleeve frame 90; wherein first integral assembly 82, 28', 26, 66' is rotatable relative to second integral assembly 68', 90 via relative motion means 58', 88. The segmented and derinded pulp can be collected during segmenting and derinding, under blades 68', by a collecting cup 42 or the like as in the first embodiment.

As illustrated in FIGS. 14, 15, the radially outer end of each blade 62' may have two opposite tapered edges 94, 96, instead of only one, as in the first embodiment, to enable shearing action in either of the two directions of rotation of the knives 40 relative to the blades 62'.

The present cutting device may adapt to citrus fruits of various dimensions, because of the arcuate shape of the knives 40 or 40' and blades 62 or 62'. This is suggested in FIG. 1, in that it can be understood from the drawings that, with citrus fruit half sections of increasing diameters, the surface of outer frame 66 covered by the peel E of the fruit 26 will be progressively increased, between minimum and maximum limit diameters of values determined by the surface of the leading edges of the knives 40 or 40'.

Blade edge sections 72 are preferably made of stainless steel, while other parts of the present cutter are preferably made from a rigid plastic material.

We claim:

1. A cutting device for segmenting and derinding a half-section of a citrus fruit, in order to collect the pulp segments thereof, said cutting device comprising: a rigid annular member; a first integral ring, a number of arcuate knives spacedly, upwardly projecting from and connected to said first ring, said arcuate knives converging toward and joined in a common apex area, said first ring and arcuate knives forming a generally semi-spherical outer open frame, said first being co-axial with and freely mounted to said annular member, each said knife having a lengthwise exterior bevelled sharpened segmenting edge facing radially outwardly and away from said first ring; a second ring, a number of arcuate blades spacedly upwardly projecting from and connected to said second ring, converging toward and joined in a common apex area, the number of said blades being equal to the number of said knives, said second ring and said blades forming a generally semi-spherical inner open frame, said blades located radially internally of said knives, said second ring being co-axial with and mounted to said annular member, each said blade having a first exterior sharpened derinding edge; slider means to enable said outer frame to rotate relative to said annular member about the center of the latter in a fruit-derinding direction; lock means to lock said inner frame to said annular member; each blade taking a concealed position inwardly of, and contiguous with an associated knife in an initial rotated position of said outer frame, said derinding edges being transverse to said knives segmenting edges and facing away from said fruit-derinding direction of rotation of said outer frame; whereby in operation, with said outer frame in said initial rotated position, the flat face of said fruit half is applied directly against and pushed fully into said outer frame for segmenting said pulp with said knives-segmenting edges, and the peel is thereafter manually rotated in said fruit-derinding direction, so as to draw therewith said outer frame exclusively of said inner frame, which is locked to said annular member, for derinding the fruit with said blade-derinding edges.

2. A cutting device as defined in claim 1, further including a base adapted to be positioned on a horizontal support surface, for supporting said annular member spacedly above said surface.

3. A cutting device as defined in claim 1, wherein each said knife segmenting edge has a cross-sectionally V-shape section.

4. A cutting device as defined in claim 3, each knife clearing said blades in all rotated positions of said outer frame, with each said blades further including a second derinding edge opposite the first one, both derinding edges concealed by and contiguous to said knife in said initial rotated position of said outer frame, whereby there are two said fruit-derinding directions of rotation of said outer frame.

5. A cutting device as defined in claim 1, further including a large rigid semi-spherical cover member, said cover member having a relatively large through-bore at its apex portion, said cover member covering said fruit half section during segmenting-derinding operations and facilitating said manual rotation thereof.

6. A cutting device as defined in claim 2, wherein said support has anti-skid elastomeric feet for engaging said support surface.

7. A cutting device as defined in claim 1, wherein said slider means includes: an annular cavity made on the top face of said second integral ring, wherein said first integral ring of said knives is matingly slidingly releasably engaged into said annular cavity.

8. A cutting device as defined in claim 1, wherein said lock means is a releasable locking means and includes a number of pins or fingers, each downwardly projecting from said second integral ring, and at least as many cavities, made into the top surface of said annular member for receiving said fingers.

9. A cutting as defined in claim 5, wherein said outer open frame integral ring includes a plurality of notches at its periphery, and said semi spherical cover member includes a plurality of inturned peripheral bottom ears, said ears adapted to releasably matingly engage said notches when said fruit half section has been pushed completely into said outer open frame and when said cover member is fully engaged around the citrus fruit half section.

10. A cutting device as defined in claim 9, wherein said slider means includes: an arcuate cavity, made on the top face of a radially outward projection of said second integral ring, and at least one finger, downwardly projecting from said first integral ring and slidingly releasably engaged into the latter arcuate cavity.

11. A cutting device as defined in claim 9, further including a large rigid semi-spherical cover member, said cover member having a relatively large through-bore at its apex portion, said cover member covering said fruit half section during segmenting-derinding operations and facilitating said manual rotation thereof.

12. A cutting device as defined in claim 11, further including a large bowl, into which is anchored said cover member coaxially thereto, the bottom end of said bowl defining an open mouth extending beyond the corresponding bottom mouth defined by said cover member.

13. A cutting device as defined in claim 12, further including a large sleeve frame member, surrounding and anchored at an intermediate section thereof to the peripheral edge section of said ring member of the blades, said sleeve frame member diametrally larger than said bowl wherein the latter is engageable therein.

14. A cutting device s defined in claim 13, further including a annular ridge, exteriorly mounted to the upper section of said bowl and designed to seat against the top edge of said sleeve frame member when said bowl has fully engaged said sleeve frame member.

15. A cutting device as defined in claim 3, wherein each knife has a radially-inner part in the path of said blades, the latter abutting said parts in said initial rotated position of said outer frame.

* * * * *